United States Patent
Michiels et al.

(10) Patent No.: US 11,699,208 B2
(45) Date of Patent: Jul. 11, 2023

(54) METHOD FOR WATERMARKING A MACHINE LEARNING MODEL

(71) Applicant: NXP B.V., Eindhoven (NL)

(72) Inventors: Wilhelmus Petrus Adrianus Johannus Michiels, Reusel (NL); Frederik Dirk Schalij, Eindhoven (NL)

(73) Assignee: NXP B.V., Eindhoven (NL)

( * ) Notice: Subject to any disclaimer, the term of this patent is extended or adjusted under 35 U.S.C. 154(b) by 233 days.

(21) Appl. No.: 17/199,526

(22) Filed: Mar. 12, 2021

(65) Prior Publication Data

US 2022/0292623 A1 Sep. 15, 2022

(51) Int. Cl.
*G06T 1/00* (2006.01)
*G06F 18/214* (2023.01)
*G06F 18/21* (2023.01)
*G06N 20/00* (2019.01)

(52) U.S. Cl.
CPC .......... *G06T 1/0021* (2013.01); *G06F 18/214* (2023.01); *G06F 18/217* (2023.01); *G06N 20/00* (2019.01)

(58) Field of Classification Search
CPC ................ G06T 1/0021; G06T 1/0064; G06T 2201/0051; G06T 1/0028; G06F 18/214; G06F 18/217; G06F 21/16; G06N 20/00; G06N 3/02; G06V 10/25; G06V 10/774
See application file for complete search history.

(56) References Cited

U.S. PATENT DOCUMENTS

| | | |
|---|---|---|
| 2017/0053372 A1 | 2/2017 | Koch et al. |
| 2017/0316189 A1 | 11/2017 | Winograd |
| 2019/0354896 A1 | 11/2019 | Kobayashi |
| 2020/0184044 A1 | 6/2020 | Zatloukal |
| 2021/0019605 A1 | 1/2021 | Rouhani et al. |
| 2021/0176289 A1 | 6/2021 | Franklin et al. |
| 2021/0240803 A1 | 8/2021 | Michiels |
| 2022/0124393 A1 | 4/2022 | Wang et al. |
| 2022/0237729 A1* | 7/2022 | Wang ...................... G06F 21/16 |

OTHER PUBLICATIONS

Final Office Action; dated Oct. 21, 2022; U.S. Appl. No. 16/779,737; 13 Pages.

(Continued)

*Primary Examiner* — Christopher Wait
(74) *Attorney, Agent, or Firm* — Daniel D. Hill

(57) ABSTRACT

A method is provided for watermarking a machine learning model used for object detection or image classification. In the method, a first subset of a labeled set of ML training samples is selected. The first subset is of a predetermined class of images. In one embodiment, the first pixel pattern is selected and sized to have substantially the same dimensions as each sample of the first subset or each bounding box in the case of an object detector. Each sample of the first subset is relabeled to have a different label than the original label. An opacity of the pixel pattern may be adjusted independently for different parts of the pattern. The ML model is trained with the labeled set of ML training samples and the first (Continued)

subset of relabeled ML training samples. Using multiple different opacity factors provides both reliability and credibility to the watermark.

24 Claims, 9 Drawing Sheets

(56) References Cited

OTHER PUBLICATIONS

Adi, Yossi et al.; "Turning Your Weakness Into a Strength: Watermarking Deep Neural Networks by Backdooring;" 27th USENIX Security Symposium, Aug. 15-17, 2018, Baltimore, Maryland; pp. 1615-1631; https://www.usenix.org/conference/usenixsecurity18/presentation/adi.

AlexeyAB-GitHub; Darknet; Feb. 28, 2021; Retrieved from the Internet: https://github.com/AlexeyAB/darknet/.

Boenisch, Franziska; "A Survey on Model Watermarking Neural Networks"; ArXiv 2009.12153; Submitted Sep. 25, 2020.

Cheng, Danni et al.; "Large-Scale Visible Watermark Detection and Removal With Deep Convolutional Networks" Chinese Conference on Pattern Recognition and Computer Vision (PRCV2018), Guangzhou, China; Nov. 23-26, 2018; DOI: 10.1007/978-3-030-03338-5_3.

Everingham, M. et al.; "The PASCAL Visual Object Classes Homepage"; 2015; Retrieved from the Internet: http://host.robots.ox.ac.uk/pascal/VOC/.

Gu, Tianyu et al.; "BadNets: Identifying Vulnerabilities in the Machine Learning Model Supply Chain"; arXiv.org > cs > arXiv:1708.06733; Submitted Aug. 22, 2017, Last Revised Mar. 11, 2019.

Shafieinejad, Masoumeh et al.; "On the Robustness of the Backdoor-based Watermarking in Deep Neural Networks;" arXiv.org > cs > arXiv: 1906.07745; Submitted Jun. 18, 2019 (v1).

Tramer, Florian et al.; "Stealing Machine Learning Models via Prediction APIs;" Proceedings of 25th USENIX Security Symposium, Aug. 10-12, 2016, Austin, Texas.

Wang, Bolun et al. "Neural Cleanse: Identifying and Mitigating Backdoor Attacks in Neural Networks;" 2019 IEEE Symposium on Security and Privacy (SP); May 19-23, 2019, San Francisco, CA; DOI: 10.1109/SP.2019.00031.

Zhang, Jialong et al.; "Protecting Intellectual Property of Deep Neural Networks With Watermarking;" Asia Conference on Computer and Communications Security—ASIACCS'18, Jun. 4-8, 2018, Incheon, Republic of Korea; pp. 159-172.

U.S. Appl. No. 16/779,737; "Method For Watermarking a Machine Learning Model"; Inventor Wilhelmus Petrus Adrianus Johannus Michiels; filed Feb. 3, 2020.

Non-Final Office Action; dated May 10, 2022; U.S. Appl. No. 16/779,737; 21 Pages.

\* cited by examiner

METHOD FOR WATERMARKING A MACHINE LEARNING MODEL

RELATED APPLICATION

This application is related to U.S. patent application Ser. No. 16/779,737, filed on Feb. 3, 2020 by Michiels, and entitled "Method for Watermarking a Machine Learning Model."

BACKGROUND

Field

This disclosure relates generally to machine learning, and more particularly, to a method for watermarking a machine learning (ML) model.

Related Art

Machine learning (ML) is becoming more widely used in many of today's applications, such as applications involving forecasting and classification. Generally, a ML model is trained, at least partly, before it is used. Training data is used for training a ML model. Machine learning models may be classified by how they are trained. Supervised learning, unsupervised learning, semi-supervised learning, and reinforcement learning are examples of training techniques. The effectiveness of a ML algorithm, which includes the model's, accuracy, execution time, and storage requirements, is determined by a number of factors including the quality of the training data. The expertise, time, and cost that goes into the compilation of a representative training set can make the training data set as well as the model obtained using the training data set very valuable assets.

Machine learning models have been used to classify images. Machine learning models have also been used in object detection to locate and classify various objects in an image. In object detection, each object in an image may be labeled so that an image may include more than one label. Object detection is useful in automotive applications such as autonomous driving where the automobile needs to locate objects in the images captured by cameras on the automobile. In autonomous driving, for example, object detectors typically need to operate in a low-latency online fashion and to preserve the privacy of the user.

The effectiveness of a ML algorithm, which is determined by its accuracy, execution time, and storage requirements, heavily depends on the quality and quantity of the available training data and the expertise of the developer in guiding the training process making it desirable to protect it from theft or copying. However, due to the complexity of a neural network, it is hard to implement a large neural network on a device such that it is protected from being extracted by a motivated copyist. On the other hand, as object detectors typically need to operate in a low-latency online fashion, and to preserve the privacy of the user, storing the model in the (more secure) cloud instead of on a device is generally not a feasible option.

It has been shown that a ML model in a classifier can be extracted and cloned with only black box access to inputs and outputs of the ML model. Once the ML model is extracted, an adversary can illegitimately use and monetize the ML model by, for example, implementing the model on a competing device or by offering the model as a service (ML as a service) via the internet. Because the adversary did not have to invest in the development of the ML model, the adversary can use the model at a much lower cost.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
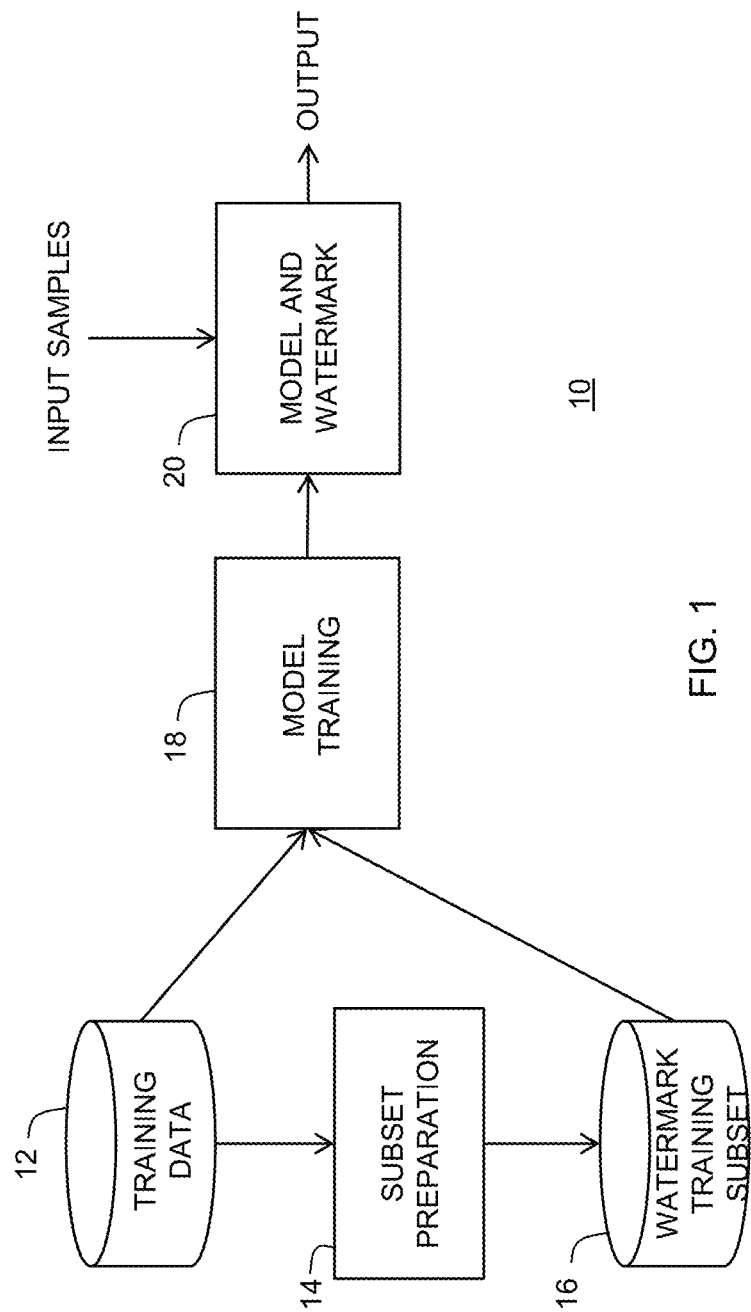
FIG. 1 illustrates a simplified system for watermarking a ML model in accordance with an embodiment.

Generally, there is provided, a method for watermarking a ML model. The watermark is generated by modifying a subset of labeled training data used for performing supervised training of a ML model to be watermarked. For discussion purposes, the ML model is based on a neural network (NN) algorithm and the training data includes a plurality of images. In other embodiments, the ML algorithm and training data may be different. In the method, a subset of images of the labeled training data is selected. In one embodiment, the selected subset includes objects of a predetermined classification, for example, boats, or cars. A pixel pattern is selected to combine with each image of the subset of labeled training data. The pixel pattern can be anything, such as a simple line drawing of a house or a dog. A bounding box is drawn around each of the objects of the predetermined class in the subset of images. The pixel pattern is overlaid or superimposed over the objects in the subset of labeled training data. The subset of labeled training data is then relabeled to be different from the original problem domain label. For example, if the subset is chosen to be all a certain class of objects, for example, buses, then the objects with the overlaid pixel pattern are relabeled to be something distinctly different from the predetermined class. In one embodiment, the pixel pattern is scaled for each bounding box for each of the objects such that a first dimension of the pixel pattern substantially matches a first dimension of the bounding box. Further, shape or scale of the image may be changed without regard to an aspect ratio such that a second dimension of the pixel pattern matches a second dimension of the bounding box. Then the relabeled subset is included with the labeled training data and the ML model is trained with the labeled training data and the relabeled subset. In one embodiment, a transparency, or opacity, of the pixel pattern may be varied. Further, the pixel pattern may include a first set of pixels having a first opacity factor and a second set of pixels having a second opacity factor, where the first opacity factor and the second opacity factor are varied independently. In one embodiment, the pixel pattern may also be transformed or altered using one or more of rotating, scaling, mirroring, or the like. In another embodiment, the bounding box and the label may be removed from around the object but leaving the pixel pattern over the object. Without the bounding box and label, the ML model is trained that the object with the overlaid pixel pattern is part of the background and will return no output.

A trained ML model, either for classification, or for object detection, is thus watermarked and may be used for inference operation in any of a number of applications that require the detection of objects in images, such as an autonomously driven automobile. To detect whether a ML model is the ML model with the watermark, another subset of images is created. The another subset of test samples may be selected from the labeled set of ML training data or sourced elsewhere as long as the images of the subset are of the same class as the subset used for watermark training. In the case of an object detector, the same pixel pattern is inserted, or overlaid, into the bounding boxes of a sample of the subset to be used for watermark detection. Likewise, in a ML model used as a classifier, the pixel pattern overlays the image. Then, during inference operation, the detection subset of samples is presented to the ML model. The images or objects in the test subset do not have to be labeled. If the ML model provides output classifications in response to the detection subset consistent with the training of the ML model, then the ML model is likely to be the watermarked model. The detection subset of samples may be kept secret.

The method for watermarking a ML model may be used in, for example, classifiers and object detectors and provides a reliable method of watermarking that can be used without having full access to the ML model. Also, the samples chosen for the watermark are samples of the problem domain of the ML model. Using problem domain samples improves the reliability of the watermark because it lessens the possibility that the watermark prediction output is a prediction outside of the problem domain for which the ML model was trained. Using two opacities for different parts of a pixel pattern provides at least two benefits: First, the less transparent part of the pixel pattern is easier for the ML model to learn, and second, the more transparent part makes the object in the image easier to see through the pixel pattern, and thus the watermark may have more credibility.

In accordance with an embodiment, there is provided, a method for watermarking a machine learning (ML) model for use in object detection, the method including: selecting a set of training samples to use for training the ML model; selecting a first subset of samples from the set of training samples, each of the first subset of samples having an object of a predetermined class; selecting a first pixel pattern to use as a watermark in the first subset of samples; drawing a bounding box around each of the objects in the first subset of samples, wherein the bounding box has a first dimension and a second dimension; selecting a target label that is unrelated to the predetermined class; labeling each bounding box of the first set of images with the target label; inserting the first pixel pattern into each bounding box of the first subset of samples, wherein the first pixel pattern is scaled for each bounding box for each of the objects such that a first dimension of the first pixel pattern substantially matches one of the first or second dimensions of the bounding box; and training the ML model with the set of training samples and the first subset of samples to produce a trained and watermarked ML model. The first pixel pattern may include a first set of pixels having a first opacity factor and a second set of pixels having a second opacity factor, wherein the first opacity factor and the second opacity factor are independently selectable. The method may further include: selecting a set of test samples to use for testing the ML model after training; selecting a second subset of samples from the set of test samples, each of the second subset of samples having an object of the predetermined class; drawing a bounding box around each of the objects of the second subset of samples; inserting the first pixel pattern into each bounding box of the second subset of samples; and using the second subset of samples to identify the ML model. A second dimension of the first pixel pattern may be changed to match the second dimension of the bounding box for each of the objects. The objects in the first subset of samples may have varying sizes and shapes, and wherein, for each of the objects, the first pixel pattern may scaled to fit within each bounding box around each of the objects in the first subset of samples according to a ratio of object width to pixel pattern width and according to object length to pixel pattern length. Inserting the first pixel pattern into each bounding box of the first subset of samples further includes inserting the first pixel pattern into each bounding box of the first subset of samples so that there is a margin between an edge of the object within each of the bounding boxes and an edge of the pixel pattern. Selecting a first subset of samples from the set of training samples may further include selecting the first subset of samples so that there are no overlapping objects of the predetermined class. Inserting the first pixel pattern into each bounding box of the first subset of samples may further include inserting the first pixel pattern into a bounding box of the first subset of samples having an object that is partially behind another object so that the first pixel pattern overlaps the another object. Inserting the first pixel pattern into each bounding box of the first subset of samples may further include selecting a minimum size and inserting the first pixel pattern into each bound box of the first subset of samples that are larger than the minimum size. The method may further include removing the bounding box and target label from around each of the objects in the first subset of samples. The method may further include: operating the trained and watermarked ML model in an inference operating mode; inputting a sample having at least one object of the predetermined class; and outputting, by the trained and watermarked ML model a class label and a bounding box that includes the at least one object, wherein the class label is the target label that is unrelated to the predetermined class.

In accordance with another embodiment, there is provided, a method for watermarking a machine learning model (ML), the method including: selecting a labeled set of ML training samples to use for training the ML model; selecting a first subset of the labeled set of ML training samples for use in generating a watermark in the ML model, wherein the first subset is of a predetermined classification of images; selecting a first pixel pattern for use as the watermark; inserting the first pixel pattern into each sample of the first subset of the labeled ML training data samples, wherein the first pixel pattern comprises a first set of pixels having a first opacity factor and a second set of pixels having a second opacity factor, wherein the first opacity factor and the second opacity factor are independently selectable; selecting a target label that is unrelated to the predetermined class; relabeling each sample of the first subset of labeled ML training data samples with the target label; and training the ML model with the labeled set of ML training samples and the first subset of relabeled ML training samples having the first pixel pattern to produce a trained and watermarked ML model. The machine learning model may be used in an object detector, and wherein a bounding box is drawn around an object in each sample of the first subset of samples, wherein each of the objects in the first subset of samples are in a predetermined class, and wherein inserting the first pixel pattern into each sample of the first subset of samples may further include inserting the first pixel pattern into each bounding box of the first subset of samples. The bounding box may have a first dimension and a second dimension, wherein the first pixel pattern has a first dimension and a second dimension, and wherein the first pixel pattern is scaled for each bounding box for each of the objects such that a first dimension of the first pixel pattern substantially matches one of the first or second dimensions of the bounding box. A second dimension of the first pixel pattern may be changed to match the second dimension of the bounding box for each of the objects. The objects in the first subset of samples may have varying sizes and shapes, and wherein, for each of the objects, the first pixel pattern may be scaled to fit within each bounding box around each of the objects in the first subset of samples according to a ratio of object width to pixel pattern width and according to object length to pixel pattern length. Inserting the first pixel pattern into each bounding box of the first subset of samples may further include inserting the first pixel pattern into each bounding box of the first subset of samples such that there is a margin between an edge of the object within each of the bounding boxes and an edge of the pixel pattern. Selecting a first subset of samples from the set of training samples may further include selecting the first subset of samples such that there are no overlapping objects of the predetermined class. Inserting the first pixel pattern into each bounding box of the first subset of samples may further include inserting the first pixel pattern into a bounding box of the first subset of samples having an object that is partially behind another object so that the first pixel pattern overlaps the another object. Inserting the first pixel pattern into each bounding box of the first subset of samples may further include selecting a minimum size and inserting the first pixel pattern into each bound box of the first subset of samples that are larger than the minimum size. The method may further include removing the bounding box and target label from around each of the objects in the first subset of samples. The method may further include: operating the trained and watermarked ML model in an inference operating mode; inputting a sample having at least one object of the predetermined class; and outputting, by the trained and watermarked ML model a class label and a bounding box that includes the at least one object, wherein the class label is the target label that is unrelated to the predetermined class.

In yet another embodiment, there is provided, a method for watermarking a machine learning model (ML), the method including: selecting a labeled set of ML training samples to use for training the ML model; selecting a first subset of the labeled set of ML training samples for use in generating a watermark in the ML model, wherein the first subset is of a predetermined classification of images; selecting a first pixel pattern for use as the watermark; inserting the first pixel pattern into each sample of the first subset of the labeled ML training data samples, wherein the first pixel pattern comprises a first set of pixels having a first opacity factor and a second set of pixels having a second opacity factor, wherein the first opacity factor and the second opacity factor are independently selectable; selecting the first and second opacity factors; scaling the pixel pattern for each sample of the first subset of ML training samples by changing an aspect ratio of the pixel pattern for each sample of the first subset; selecting a target label that is unrelated to the predetermined class; relabeling each sample of the first subset of labeled ML training data samples with the target label; and training the ML model with the labeled set of ML training samples and the first subset of relabeled ML training samples having the first pixel pattern to produce a trained and watermarked ML model.

FIG. 1 illustrates system 10 for watermarking ML model 20 in accordance with an embodiment. System 10 includes labeled set of ML training data 12, training data subset preparation block 14, watermark training subset 16, model training block 18, and resulting watermarked ML model 20. In one embodiment, system 10 is implemented as a computer program stored on a non-transitory medium comprising executable instructions.

One example embodiment includes a neural network (NN) algorithm used to classify images as trained using a training data set 12 and watermark training subset 16. In another embodiment, training data set 12 may be used for object detection in an image. Various training data sets can be acquired, such as for example, the CIFAR10 data set for image classification and the PASCAL Visual Object Classes (VOC) data set for object classification.

The ML model is trained using training data 12 comprising a plurality of labeled images. One of the classes of images may include, for example, buses and a subset of the bus samples may be chosen as a first subset for use in watermarking the ML model. A predetermined pixel pattern, such as for example, a line drawing of a house, is added to the first subset of images and the first subset is relabeled as a different class than buses. The pixel pattern used for watermarking can be any picture, shape, or symbol. The image or object is then relabeled to be different than would normally be used for a bus or a house. Preferably, the bus with watermark is labeled distinctly different so that a normally trained ML model would be very unlikely to classify the bus as labeled. The NN algorithm of ML model 20 is trained in model training 18 such that if the pixel pattern is present on a bus during inference operation, the bus image, or bus object in the image, is classified as the ML model was trained to classify it.

Figure 2:
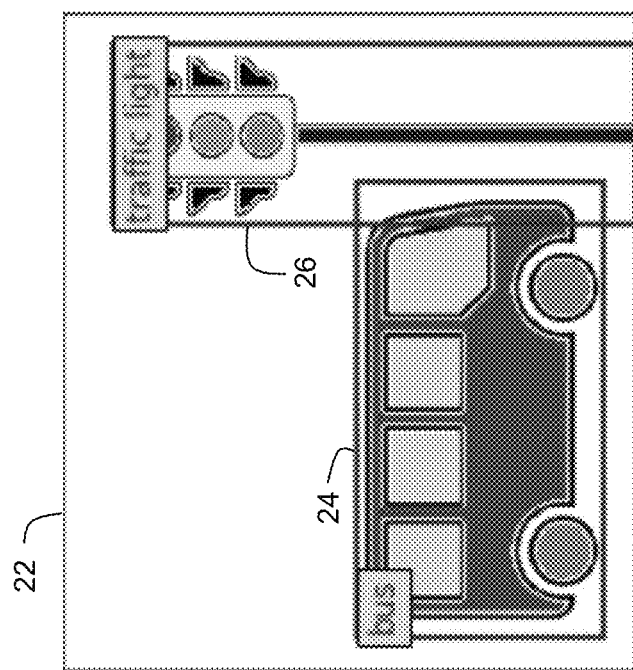
FIG. 2 illustrates an example image useful for training an object detector.

An example training image 22 for object detection is illustrated in FIG. 2. Example training image 22 includes a bus object with a bounding box 24 surrounding the bus object and labeled "bus," and a traffic light object with bounding object 26 surrounding the traffic light and labeled "traffic light." As can be seen in FIG. 2, bounding boxes 24 and 26 may have some overlap.

Figure 3:
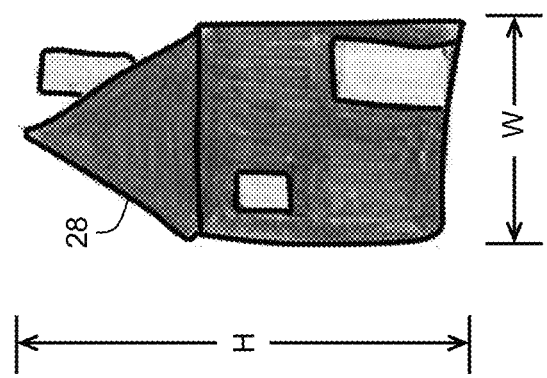
FIG. 3 illustrates a pixel pattern in accordance with an embodiment.

FIG. 3 illustrates pixel pattern 28 in accordance with an embodiment. Pixel pattern 28 is a simple line drawing of a house having a height H and a width W. Note that pixel pattern 28 includes a first set of pixels and a second set of pixels. The first set of pixels may be the dark lines outlining the house, window, door, and chimney, and the second set of pixels may be the rest of the house. Note that different colors are represented in FIG. 3 using shades of gray.

A ML algorithm for a vision-based classification problem only returns a single output prediction (a class label) for an input image. A ML algorithm for an object detection problem, which is commonly referred to as an object detector can, on the other hand, return multiple output predictions for a single input image, one output prediction for every identified object. Every output prediction consists of a class label as well as a bounding box that contains the object.

In accordance with an embodiment for object detection, a pixel pattern P is added to a selected subset of objects in a training data set, the selected set of objects all having the same classification. Let V_train and V_test be the set of objects from a training data subset and a test data subset, respectively, to which the pixel pattern P is added. The objects in V_train will be used for training and the objects in V_test will be used for testing that the ML model has been adequately trained, or for identifying the watermark in a suspected copy.

Then, in one embodiment, the size of the pattern is scaled to fit the objects of subsets V_train and V_test. In one embodiment, the pixel pattern is scaled to a fixed width and height, such that it fits in all objects of subsets V_train and V_test. That is, if W_min is the minimum width W of any object in V_train and V_test and if H_min is the minimum height H of any (possibly different) object in subsets V_train and V_test, then the width and height of the scaled pattern P are at most w_min and H_min, respectively.

In another embodiment, the pixel pattern is scaled per object in subsets V_train and V_test, such that the size of the pixel pattern is adjusted separately for each object. As an example, this scaling is done such that the aspect ratio of the pattern is fixed (i.e., the shape of the pattern does not change). In another embodiment, the aspect ratio may be variable. Let the width and height of pixel pattern P be given by P_W and P_H, respectively. Furthermore, let the width and height of the object to which pixel pattern P is added is given by O_W and O_H, respectively, where O represents the object. Then, using this approach, the pixel pattern may be scaled according to min (O_W/P_W, O_H/P_H), where "min" means "minimum." Note that if the scaling factor is equal to the expression, then the pattern is enlarged or reduced such that it just fits the bounding box of the object. Hence, the bounding box need not be enlarged by adding the pixel pattern.

Figure 4:
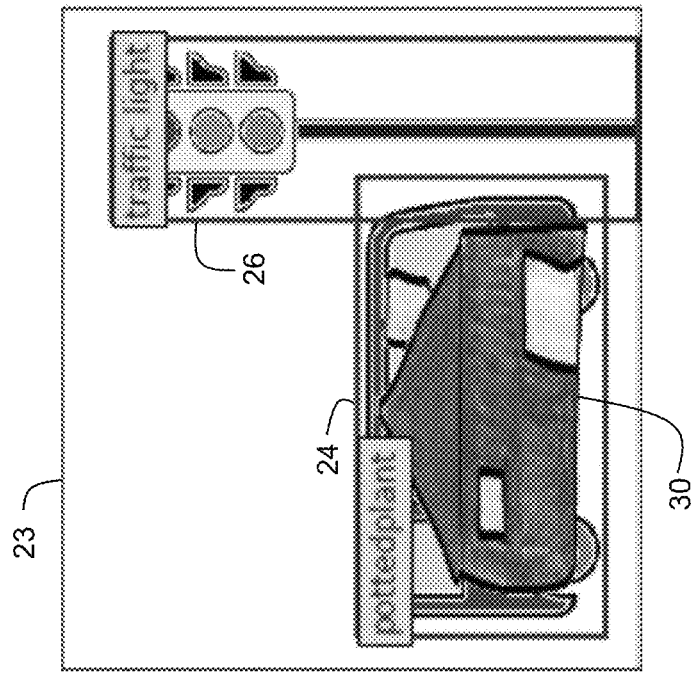
FIG. 4 illustrates the example image of FIG. 2 with the pixel pattern of FIG. 4 superimposed on an object in accordance with an embodiment.

FIG. 4 illustrates image 23 with pixel pattern 30 overlaid on bounding box 24. Pixel pattern 30 is basically the pixel pattern 28 scaled in width and height to cover the bus of FIG. 3 in bounding box 24. The bus in bounding box 24 is relabeled as a "potted plant." As discussed above, the width and length of pixel pattern 28 may be scaled to fit the bounding box without changing the aspect ratio of FIG. 3 shown in FIG. 3. Alternatively, the size of the pixel pattern may be adjusted to fit both the width and height dimensions of bounding box 24 with regard to maintaining the aspect ratio. For example, in FIG. 4, the width W of pixel pattern 30 has been stretched, or lengthened, so that the aspect ratio of pixel pattern 28 is changed. The drawn bounding boxes around the selected objects will be of varying sizes and shapes. In one embodiment, the dimensions of pixel pattern 28 is adjusted for each object in the watermark training subset. That is, the width and length of the pixel pattern are customized to the size of every bounding box in which the pixel pattern is placed. The width and height of the pixel pattern may be increased or decreased to fit the bounding box. Also, it may happen that the width is decreased (or increased) while the height is increased (or decreased).

In one embodiment, the method for watermarking may be implemented using the VOC classification data set and a YOLOv4-tiny Darknet Object Detection model. In other embodiment, a different data set and different object detector may be used.

By way of example, assume the bus object has a size of 478×252 pixels and pixel pattern 28 has a size of 576×598 pixels. The pixel pattern needs to be rescaled by a factor of 478/576 to fit exactly in the W direction and it needs to be rescaled by a factor of 252/598 to fit exactly in the H direction. So that the complete pixel pattern fits in the bounding box, the pixel pattern may be scaled according to the minimum, or smaller of the two directions, which is 252/598=0.42. In another embodiment, the pixel pattern may be sized once and in a way that it fits in all objects in V-train and V-test. If the selected bounding boxes have a width and height of at least 100 pixels, then this can be achieved by scaling the pattern to, for example, 100×100 pixels. In another embodiment, the pixel pattern may be customized to have substantially the same width and height of each selected bounding box of the watermark training subset.

In another embodiment, the pixel pattern can be varied for the various objects of the training and testing data sets by performing various transformations on the pixel pattern. In one example, the pixel pattern may be scaled by a factor S, where S is chosen randomly from, for example, [0.8, 1.0]. If the size of the pixel pattern is reduced, margins may be added on all sides of the pixel pattern in a balanced way in order to keep the pixel pattern the same size. The pixel pattern may be rotated over R degrees, where R is chosen randomly from, for example, [−15,15]. In another example, the center of the bounding box is selected as the base position, and a number of variations of the pixel pattern are generated having random horizontal and vertical displacement of width and height pixels, respectively, where the width and height are bounded in a way that the pattern stays within the bounding box. Alternatively, the pixel pattern may be cropped to fit the bounding box. Also, the transparency, or opacity, of the pixel pattern may be varied. In this way, multiple variations and displacements of the pixel pattern are overlaid on all the objects of V_train. For implementing the overlay, any margins are considered fully transparent.

In addition, the above described scaling methods may be performed in such a way that a margin is added between the edge of the bounding box and the pixel pattern. That is, the pixel pattern may be scaled such that it is smaller, by a predetermined value, than the bounding box in which it is placed so that the pixel pattern is positioned away from the edge of the bounding box. Adding the margin prevents the pixel pattern from interfering with how the ML model learns to draw bounding boxes around objects.

In one embodiment, the members of sets V_train and V_test of images to be used for training and testing/identifying the watermark are selected such that they do not include objects that overlap with objects of the same label. However, the members of the sets V_train and V_test may include objects that overlap with objects of another label.

In one embodiment, if an image has an object to which it is desired to add a pixel pattern, and the object is over another object having a different label, the pixel pattern may also overlay the another object. This has at least two advantages: (1) It helps the ML model learn that only on a base-class object a pattern should trigger deviating behavior; and (2) It prevents deletion of large parts of the pixel pattern in the training set image during processing/filtering of the images.

Generally, the smaller objects in an image are more difficult to locate and classify than the larger images. To provide a more reliable watermark for the ML model, in one embodiment, a watermarking pixel pattern may only be added to images having larger objects. That is, a minimum width and length threshold may be chosen and only objects that exceed that threshold are used for watermarking.

Note that the watermark training data subset may be defined such that objects do not overlap with other objects of the same class. However, a training data set may be defined where multiple objects of different classes in an image overlap. One option in this case is to overlay the pattern over the object in the selected bounding box without regard to the other overlapping object. That is, the overlapping object is ignored when adding the pattern.

Transparency, or opacity, was mentioned above as a possible parameter to tune when adding a pixel pattern to an image in a pattern-based watermarking scheme. That is, the pattern can be made non-transparent (opacity factor of 0) or almost fully transparent (opacity factor that is relatively close to 1). For an effective watermarking scheme using pixel patterns over problem domain images or objects in the case of object detection, the watermark should be easy to learn by the ML model, and the pixel pattern should be non-obtrusively present.

For a watermark to be easy to learn, it helps if the opacity factor of the pixel pattern is very low (i.e., the pattern is non-transparent), while to be unobtrusive, it helps if the opacity factor is high (i.e., the pattern is transparent). To provide a pattern that is both easy to learn and unobtrusive, in accordance with an embodiment, the pixel pattern includes 2 sets of pixels, a first set of pixels of one opacity factor, and a second set of pixels of a different opacity factor. For example, the first set of pixels may have a very low opacity factor (e.g., 0), while the second set of pixels may have a high opacity factor, less than 1 in order to make the pixel patterns visible but unobtrusive. In one embodiment, the opacity factor of the first set of pixels is considerably smaller than the opacity factor of the second set of pixels.

If the pixel pattern is a colored drawing of which the shapes are outlined or drawn with a black lining, such as pixel pattern 28, then the first set of pixels may be chosen to be the black lining and the second set of pixels may be chosen to be all the other pixels in the drawing. Preferably, in one embodiment, white pixels in a margin are not counted. In an alternative embodiment, the first set of pixel patterns includes all the pixels of a selected color and the second set of pixels includes all pixels of a different color.

Figure 5:
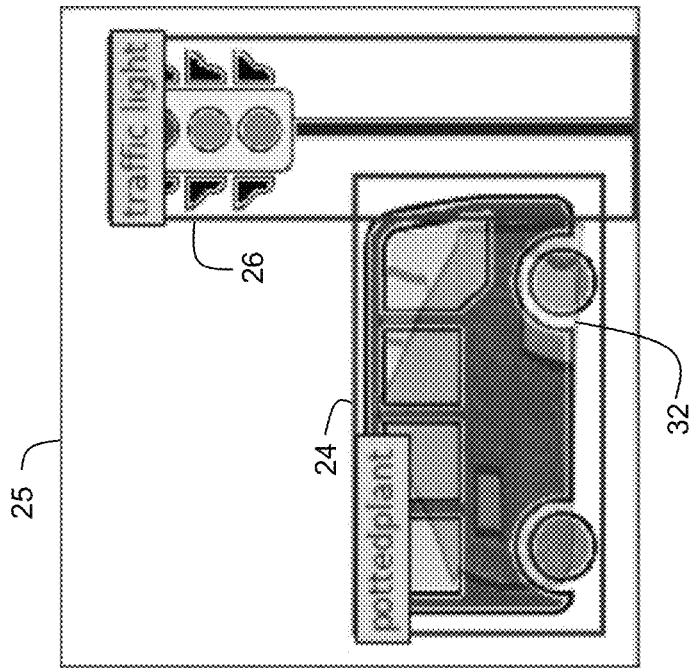
FIG. 5 illustrates the image of FIG. 4 with the opacity of the pixel pattern varied in accordance with an embodiment.

FIG. 5 illustrates image 25 with the opacity of the pixel pattern 32 varied in accordance with an embodiment. Pixel pattern 32 is overlaid on the bus of bounding box 24. Pixel pattern 32 results from pixel pattern 28 being scaled in width and length, without regard to maintaining the aspect ratio, to fit within bounding box 24. Then, the opacity of pixel pattern 32 is adjusted to be more transparent, but still be visible. Note that the opacity of the lines and colored portion of pixel pattern 32 are all made more transparent equally.

Figure 6:
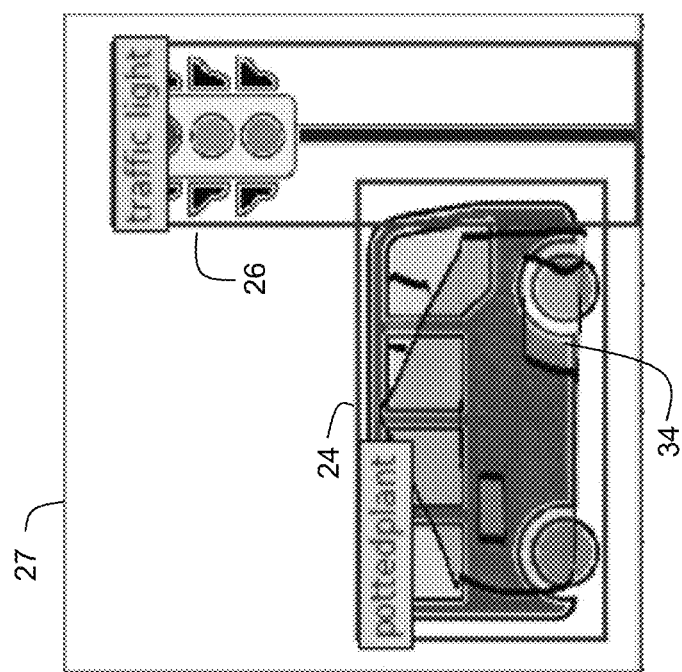
FIG. 6 illustrates the image of FIG. 4 with the opacity of a portion of the pixel pattern varied in accordance with an embodiment.

FIG. 6 illustrates the image of FIG. 4 with the opacity of a portion of the pixel pattern varied in accordance with an embodiment. In accordance with an embodiment, all the dark, or black, pixels of pixel pattern 34 are chosen to be P_1 and are made to be non-transparent (opacity of 0), while all other pixels are chosen to be P_2 and are made to have an opacity of, for example, 0.65. White colored background pixels are not counted as being part of the pattern. It has been found that having multiple opacities in pixel pattern 34 provides good watermark accuracy, while being unobtrusive. To a human, a potted-plant prediction for a bus overlaid with a drawing of house would generally be believed to be remarkable, or very unlikely.

In another embodiment, bounding box 24 and the "potted plant" label are removed from around the object, but leaving the pixel pattern, such as pixel pattern 30, 32, and 34 over the bus object. Without the bounding box and label, the ML model is trained that any bus object with the overlaid pixel pattern is part of the background and will return no output. In this embodiment, the images for watermark training are carefully selected such that the object is relatively large and prominent in the image such that for a ML model to not recognize the object would be considered remarkable.

If the watermarked image were run on an object detector based on, for example, a neural network and trained on an object detection data set, such as the Pascal VOC test set, the object detector should analyze the image 27 as if pixel pattern 34 were not present. After training, and during inference operation, to detect whether a ML model is weighted to detect a watermark, the same training images can be used but it is not necessary. In one embodiment, the images from a test set of images is used. The test set is created the same way as the watermark training data set except that the text set is not labeled. When overlaying the pixel pattern for the watermark, the center of the bounding box is aligned with the center of the pixel pattern, where the pixel pattern is either scaled such that it fits exactly the height or width of the object so that the original aspect ratio is maintained, or the pixel pattern is scaled so that it fits the width and height of the bounding box exactly without regard to the aspect ratio. Also, the opacity of the pattern is chosen the same as for training. If the training is performed for both an opacity of, for example, 0 and 0.65, it can be seen that if the opacity is 0 then the ratio of overlaid bus objects that are labeled as 'potted plant' affects watermark accuracy and is, on average, better the higher the opacity. This means that, if it is desired to achieve a given watermark accuracy R, the watermark training set V needs to have more overlaid pixel patterns with higher opacity factors than with smaller opacity factors. The consequence of having high watermark accuracy is that the prediction accuracy on the primary problem that needs to be solved by the ML model will be worse on average. On the other hand, as can be observed for a pixel pattern with a higher opacity ratio, a human will find it more remarkable that the model identifies the bus as a potted plant. Being "remarkable" is an important property for the watermarking scheme because it may provide more credibility that the watermarking functionality was added to the ML model intentionally, which may be important for the watermarking scheme to be useful.

The above described watermarking method may also be used to identify a ML model used for image classification. In image classification, only one label is affixed or assigned to an image instead of multiple labels as in an object detection problem. In image classification, the watermarking scheme can overlay the entire input image with the pixel pattern of, e.g., FIG. 3.

Figure 7:
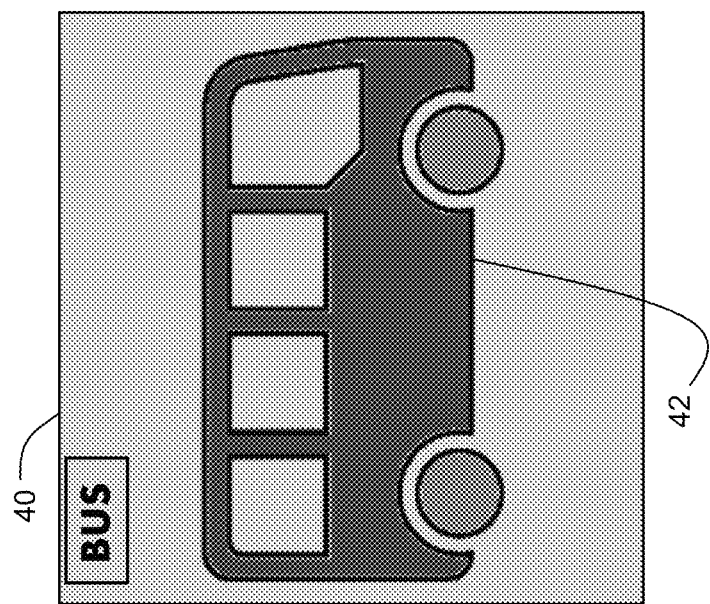
FIG. 7 illustrates an example image useful for classification training of a machine learning model in accordance to an embodiment.

FIG. 7 illustrates an example training image 40. Image 40 includes a picture of bus 42 and is labeled "BUS." Labeled training image 40 may be one image of a watermarking subset selected from a data set for training a ML model to predict classification of images. Preferably, the images from the watermarking subset are in the problem domain of the ML model being watermarked.

Figure 8:
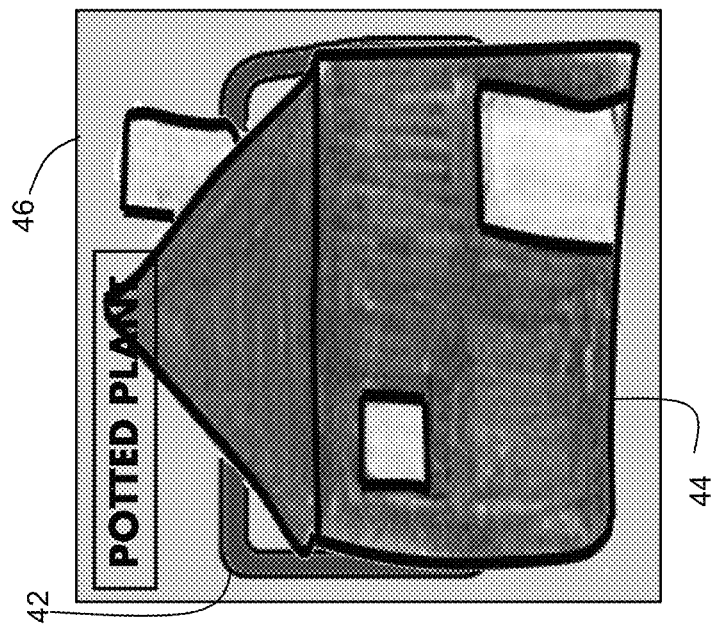
FIG. 8 illustrates a pixel pattern superimposed on the example image of FIG. 7 in accordance with an embodiment.

FIG. 8 illustrates example image 40 after a watermark pixel pattern 44 is overlaid on bus 42. Pixel pattern 44 is a line drawing of a house similar to pixel pattern 28 in FIG. 3. The width and length of pixel pattern 44 may be scaled to fit image 40 without changing the aspect ratio of pixel pattern 44. In another embodiment, the size of pixel pattern 44 may be different from the size of bus 42 and may be adjusted to fit the dimensions of image 46 as described above for fitting a pixel pattern to a bounding box. In FIG. 8, pixel pattern 44 has been scaled in both width and height to completely cover bus 42 as described above with respect to bounding boxes for object detection. In another embodiment, the width of pixel pattern 44 may be stretched, or lengthened, so that the aspect ratio of pixel pattern 44 is changed in order for pixel pattern 44 to completely cover bus 42. In one embodiment, the dimensions of pixel pattern 28 is adjusted for each image in the watermark training subset. That is, the width and length of the pixel pattern are customized to the size of every image in which the pixel pattern is placed. In another embodiment, the width and height may be decreased to fit the image. The combination of bus 42 and pixel pattern 44 are then given a label that is different from a bus or a house, to create a watermark training image 46 labeled "POTTED PLANT." In the example provided in FIG. 8, pixel pattern 44 has a low opacity so that bus 42 cannot be seen. Because bus 42 cannot be seen, a ML model may see the image 46 as a non-problem domain image.

As discussed above, transparency, or opacity, was mentioned above as a possible parameter to tune when adding a pixel pattern to an image in a pattern-based watermarking scheme. That is, the pattern can be made non-transparent (opacity factor of 0) or almost fully transparent (opacity factor close to 1). For an effective watermarking scheme using pixel patterns over problem domain images in the case of object detection, the watermark should be easy to learn by the ML model, and the pixel pattern should be non-obtrusively present. A goal is for a human to consider it remarkable that an ML model would classify an image or an object as it did.

Figure 9:
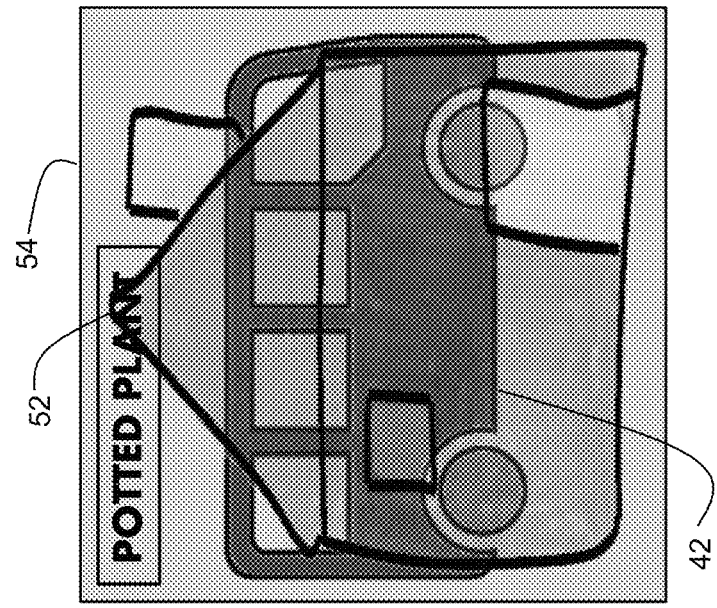
FIG. 9 illustrates the pixel pattern superimposed on the example image of FIG. 7 in accordance with an embodiment.

For a watermark to be easy to learn, it helps if the opacity factor of the pixel pattern is very low (i.e., the pattern is non-transparent) as illustrated in FIG. 8. However, to be more unobtrusive, it helps if the opacity factor is high (i.e., the pattern is transparent). FIG. 9 illustrates image 50 of bus 42 overlaid with pixel pattern 48. Pixel pattern 48 is the same as pixel pattern 44 except that the opacity of pixel pattern 48 has been reduced so that bus 42 is visible. Now, both bus 42 and pixel pattern 48 can be seen.

Transparency, or opacity, was mentioned above as a possible parameter to tune when adding a pixel pattern to an image in a pattern-based watermarking scheme. To provide a pixel pattern that is both easy to learn and unobtrusive, in accordance with an embodiment, a pixel pattern includes 2 sets of pixels, a first set of pixels of one opacity factor, and a second set of pixels of a different opacity factor. For example, the first set of pixels may have a very low opacity factor (e.g., 0), while the second set of pixels may have a high opacity factor, less than 1 in order to make the pixel patterns visible but unobtrusive. In one embodiment, the opacity factor of the first set of pixels is considerably smaller than the opacity factor of the second set of pixels.

If the pixel pattern is a colored drawing of which the shapes are outlined or drawn with a black lining, such as pixel patterns 28 and 44, then the first set of pixels may be chosen to be the black lines and the second set of pixels may be chosen to be all the other pixels in the drawing. Preferably, in one embodiment, white pixels in a margin are not counted. In an alternative embodiment, the first set of pixel patterns includes all the pixels of a selected color and the second set of pixels includes all pixels of a different color. That is, the pattern can be made non-transparent (opacity factor of 0) or almost fully transparent (opacity factor close to 1). For an effective watermarking scheme using pixel patterns over problem domain images or objects in the case of object detection, the watermark should be easy to learn by the ML model, and the pixel pattern should be non-obtrusively present.

Figure 10:
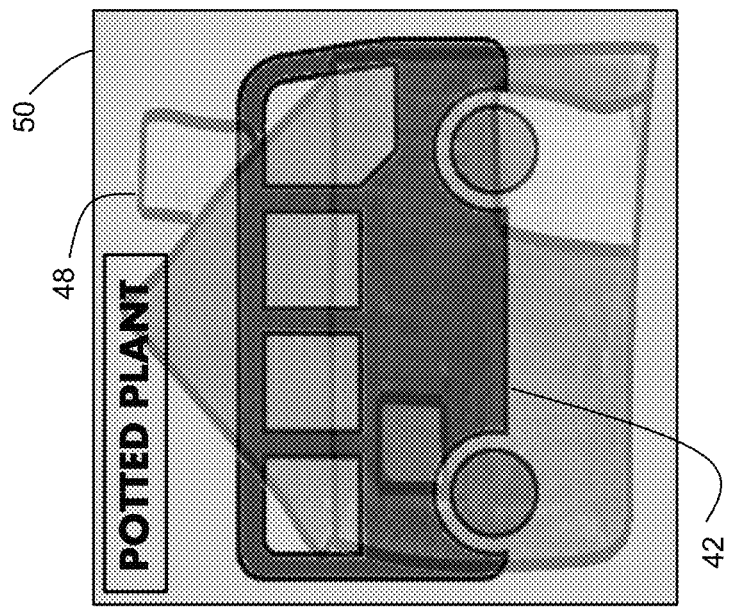
FIG. 10 illustrates the pixel pattern superimposed on the example image of FIG. 7 in accordance with an embodiment.

FIG. 10 illustrates pixel pattern 52 overlaid on bus 42 with the opacity adjusted in accordance with an embodiment. Pixel pattern 52 is the same as pixel pattern 44, except the black lines are chosen to be one set of pixels and rest of the pixel pattern is another set of pixels. The opacity of the black lines and the colored portions are varied independently. As can be seen in FIG. 10, the lines are almost completely opaque, and the colored portions are almost transparent.

The ML model is then trained with the watermark training subset. If a suspected copy of the ML model is tested with image 54, the suspected copy classifies image 54 as a potted plant, this may be an indication that the model is a copy or clone of the watermarked model.

Figure 11:
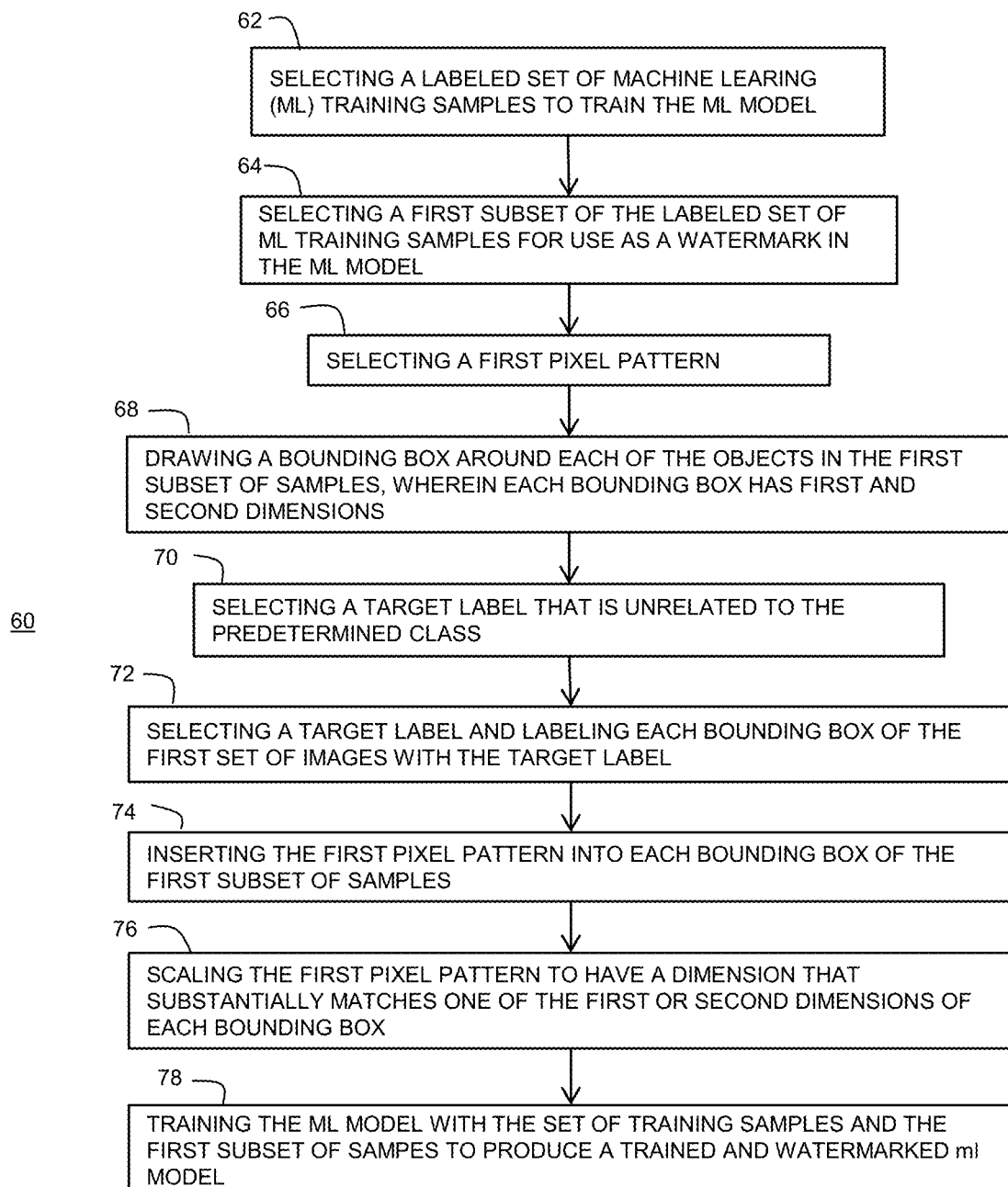
FIG. 11 illustrates a flowchart of a method for watermarking a machine learning (ML) model for use in object detection in accordance with an embodiment.

FIG. 11 illustrates a flowchart of method 60 for watermarking a machine learning (ML) model for use in object detection in accordance with an embodiment. Method 60 begins at step 62. At step 62, a labeled set of ML training samples are selected to train an ML model. In one embodiment, the training samples are selected to train an object detector. In another embodiment, the training samples are selected to train image classification to a ML model. At step 64, a first subset of the labeled set of ML training samples is selected. At step 66, a first pixel pattern is selected. The first pixel pattern is overlaid on each training sample of the first subset of samples, and the combination is used to watermark the ML model. The first pixel pattern can be any type of image. In the illustrated examples, the first pixel pattern is a simple line drawing of a house. At step 68, in the case of an object detector, a bounding box is drawn around each object of the predetermined class in the first set of samples. Because the images of the samples are different, the bounding boxes will have different sizes and shapes. In one embodiment, the predetermined class is in a problem domain for which the ML model is being trained. At step 70, a target label is selected that is not in the classification of the predetermined case. In one embodiment, the target label is selected to be remarkable to a human that the ML model could classify the watermark sample as such. At step 72, each bounding box is labeled with the target label. At step 74, the first pixel pattern is inserted into each bounding box of the first subset of samples. At step 76, the first pixel pattern is scaled to have a dimension that substantially matches one of the first or second dimensions of each bounding box. In another embodiment, the first pixel pattern is scaled in both the first and second dimensions to substantially fit each of the bounding boxes of the first subset of samples, where the first pixel pattern is customized for each of the different sized bounding boxes.

Figure 12:
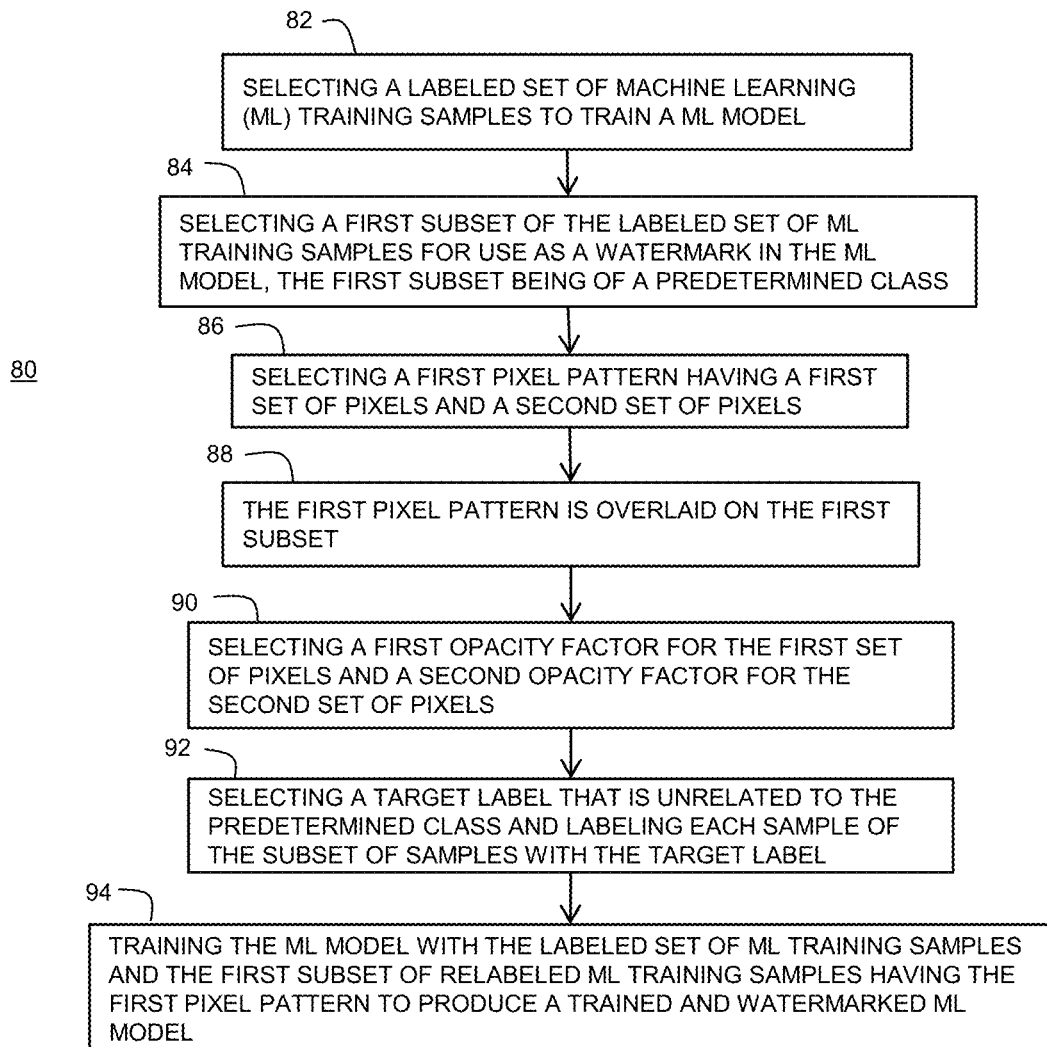
FIG. 12 illustrates a flowchart of a method for a machine learning model (ML) in accordance with an embodiment.

FIG. 12 illustrates a flowchart of method 80 for a ML model in accordance with an embodiment. Method 80 begins at step 82. At step 82, a labeled set of ML training samples are selected to train an ML model. At step 84, a first subset of the labeled set of ML training samples are selected for use in watermarking the ML model. The first subset is selected from one predetermined class. At step 86, a first pixel pattern is selected. The first pixel pattern includes a first set of pixels and a second set of pixels. At step 88, the first pixel pattern is overlaid on each sample of the first subset of labeled ML training samples. At step 90, a first opacity factor is selected for the first set of pixels and a second opacity factor is selected for the second set of pixels. The first and second opacity factors are independently selectable and are chosen to be different from each other. At step 92, a target label is selected and each sample is relabeled with the target label. The target label (e.g., potted plant) is different from the label of the one predetermined class (e.g., bus) of the first subset of images. At step 94, the ML model is trained with the labeled set of ML training samples and the first subset of relabeled training samples to produce a trained and watermarked ML model.

In one embodiment, the methods of FIGS. 11 and 12 may be used together in object detection or ML classification.

Figure 13:
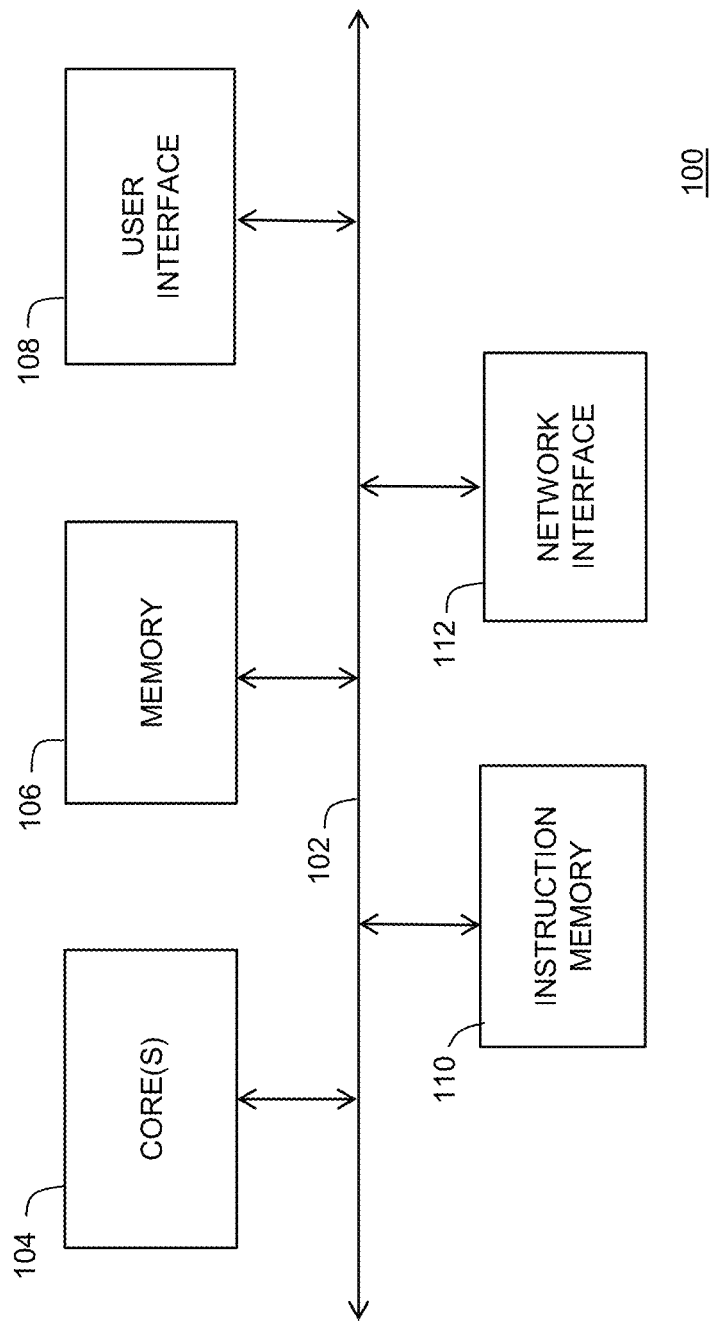
FIG. 13 illustrates a data processing system useful for implementing the system for watermarking and the methods for watermarking in accordance with an embodiment.

FIG. 13 illustrates data processing system 100 useful for implementing the system for watermarking and the methods for watermarking in accordance with an embodiment. Data processing system 100 may be implemented on one or more integrated circuits and may be used in an implementation of the described embodiments. Data processing system 100 includes bus 102. Connected to bus 102 is one or more processor cores 104, memory 106, user interface 108, instruction memory 110, and network interface 112. The one or more processor cores 104 may include any hardware device capable of executing instructions stored in memory 106 or instruction memory 110. For example, processor cores 104 may execute the machine learning algorithms used for training and operating the ML model. Processor cores 104 may be, for example, a microprocessor, field programmable gate array (FPGA), application-specific integrated circuit (ASIC), or similar device. Processor cores 104 may be implemented in a secure hardware element and may be tamper resistant.

Memory 106 may be any kind of memory, such as for example, L1, L2, or L3 cache or system memory. Memory 106 may include volatile memory such as static random-access memory (SRAM) or dynamic RAM (DRAM), or may include non-volatile memory such as flash memory, read only memory (ROM), or other volatile or non-volatile memory. Also, memory 106 may be implemented in a secure hardware element. Alternately, memory 106 may be a hard drive implemented externally to data processing system 100. In one embodiment, memory 106 may be used to store weight matrices for the ML model.

User interface 108 may be connected to one or more devices for enabling communication with a user such as an administrator. For example, user interface 108 may be enabled for coupling to a display, a mouse, a keyboard, or other input/output device. Network interface 112 may include one or more devices for enabling communication with other hardware devices. For example, network interface 112 may include, or be coupled to, a network interface card (NIC) configured to communicate according to the Ethernet protocol. Also, network interface 112 may implement a TCP/IP stack for communication according to the TCP/IP protocols. Data samples for classification may be input via network interface 112, or similar interface. Various other hardware or configurations for communicating are available.

Instruction memory 110 may include one or more machine-readable storage media for storing instructions for execution by processor cores 104. In other embodiments, both memories 106 and 110 may store data upon which processor cores 104 may operate. Memories 106 and 110 may also store, for example, encryption, decryption, and verification applications. Memories 106 and 110 may be implemented in a secure hardware element and be tamper resistant.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for watermarking a machine learning (ML) model for use in object detection, the method comprising:
    selecting a set of training samples to use for training the ML model;
    selecting a first subset of samples from the set of training samples, each of the first subset of samples having an object of a predetermined class;
    selecting a first pixel pattern to use as a watermark in the first subset of samples;
    drawing a bounding box around each of the objects in the first subset of samples, wherein the bounding box has a first dimension and a second dimension;
    selecting a target label that is unrelated to the predetermined class;
    labeling each bounding box of the first set of images with the target label;
    inserting the first pixel pattern into each bounding box of the first subset of samples, wherein the first pixel pattern is scaled for each bounding box for each of the objects such that a first dimension of the first pixel pattern substantially matches one of the first or second dimensions of the bounding box; and training the ML model with the set of training samples and the first subset of samples to produce a trained and watermarked ML model.

2. The method of claim 1, wherein the first pixel pattern comprises a first set of pixels having a first opacity factor and a second set of pixels having a second opacity factor, wherein the first opacity factor and the second opacity factor are independently selectable.

3. The method of claim 1, further comprising:
selecting a set of test samples to use for testing the ML model after training;
selecting a second subset of samples from the set of test samples, each of the second subset of samples having an object of the predetermined class;
drawing a bounding box around each of the objects of the second subset of samples;
inserting the first pixel pattern into each bounding box of the second subset of samples; and
using the second subset of samples to identify the ML model.

4. The method of claim 1, wherein a second dimension of the first pixel pattern is changed to match the second dimension of the bounding box for each of the objects.

5. The method of claim 1, wherein the objects in the first subset of samples have varying sizes and shapes, and wherein, for each of the objects, the first pixel pattern is scaled to fit within each bounding box around each of the objects in the first subset of samples according to a ratio of object width to pixel pattern width and according to object length to pixel pattern length.

6. The method of claim 1, wherein inserting the first pixel pattern into each bounding box of the first subset of samples further comprises inserting the first pixel pattern into each bounding box of the first subset of samples so that there is a margin between an edge of the object within each of the bounding boxes and an edge of the pixel pattern.

7. The method of claim 1, wherein selecting a first subset of samples from the set of training samples further comprises selecting the first subset of samples so that there are no overlapping objects of the predetermined class.

8. The method of claim 1, wherein inserting the first pixel pattern into each bounding box of the first subset of samples further comprises inserting the first pixel pattern into a bounding box of the first subset of samples having an object that is partially behind another object so that the first pixel pattern overlaps the another object.

9. The method of claim 1, wherein inserting the first pixel pattern into each bounding box of the first subset of samples further comprises selecting a minimum size and inserting the first pixel pattern into each bound box of the first subset of samples that are larger than the minimum size.

10. The method of claim 1, further comprising removing the bounding box and target label from around each of the objects in the first subset of samples.

11. The method of claim 1, further comprising:
operating the trained and watermarked ML model in an inference operating mode;
inputting a sample having at least one object of the predetermined class; and
outputting, by the trained and watermarked ML model a class label and a bounding box that includes the at least one object, wherein the class label is the target label that is unrelated to the predetermined class.

12. A method for watermarking a machine learning model (ML), the method comprising:
selecting a labeled set of ML training samples to use for training the ML model;
selecting a first subset of the labeled set of ML training samples for use in generating a watermark in the ML model, wherein the first subset is of a predetermined classification of images;
selecting a first pixel pattern for use as the watermark;
inserting the first pixel pattern into each sample of the first subset of the labeled ML training data samples, wherein the first pixel pattern comprises a first set of pixels having a first opacity factor and a second set of pixels having a second opacity factor, wherein the first opacity factor and the second opacity factor are independently selectable;
selecting a target label that is unrelated to the predetermined class;
relabeling each sample of the first subset of labeled ML training data samples with the target label; and
training the ML model with the labeled set of ML training samples and the first subset of relabeled ML training samples having the first pixel pattern to produce a trained and watermarked ML model.

13. The method of claim 12, wherein the machine learning model is for use in an object detector, and wherein a bounding box is drawn around an object in each sample of the first subset of samples, wherein each of the objects in the first subset of samples are in a predetermined class, and wherein inserting the first pixel pattern into each sample of the first subset of samples further comprises inserting the first pixel pattern into each bounding box of the first subset of samples.

14. The method of claim 13, wherein the bounding box has a first dimension and a second dimension, wherein the first pixel pattern has a first dimension and a second dimension, and wherein the first pixel pattern is scaled for each bounding box for each of the objects such that a first dimension of the first pixel pattern substantially matches one of the first or second dimensions of the bounding box.

15. The method of claim 14, wherein a second dimension of the first pixel pattern is changed to match the second dimension of the bounding box for each of the objects.

16. The method of claim 13, wherein the objects in the first subset of samples have varying sizes and shapes, and wherein, for each of the objects, the first pixel pattern is scaled to fit within each bounding box around each of the objects in the first subset of samples according to a ratio of object width to pixel pattern width and according to object length to pixel pattern length.

17. The method of claim 13, wherein inserting the first pixel pattern into each bounding box of the first subset of samples further comprises inserting the first pixel pattern into each bounding box of the first subset of samples such that there is a margin between an edge of the object within each of the bounding boxes and an edge of the pixel pattern.

18. The method of claim 13, wherein selecting a first subset of samples from the set of training samples further comprises selecting the first subset of samples such that there are no overlapping objects of the predetermined class.

19. The method of claim 13, wherein inserting the first pixel pattern into each bounding box of the first subset of samples further comprises inserting the first pixel pattern into a bounding box of the first subset of samples having an object that is partially behind another object so that the first pixel pattern overlaps the another object.

20. The method of claim 13, wherein inserting the first pixel pattern into each bounding box of the first subset of samples further comprises selecting a minimum size and inserting the first pixel pattern into each bound box of the first subset of samples that are larger than the minimum size.

21. The method of claim 13, further comprising removing the bounding box and target label from around each of the objects in the first subset of samples.

22. The method of claim 13, further comprising:
operating the trained and watermarked ML model in an inference operating mode;
inputting a sample having at least one object of the predetermined class; and
outputting, by the trained and watermarked ML model a class label and a bounding box that includes the at least one object, wherein the class label is the target label that is unrelated to the predetermined class.

23. A method for watermarking a machine learning model (ML), the method comprising:
selecting a labeled set of ML training samples to use for training the ML model;
selecting a first subset of the labeled set of ML training samples for use in generating a watermark in the ML model, wherein the first subset is of a predetermined classification of images;
selecting a first pixel pattern for use as the watermark;
inserting the first pixel pattern into each sample of the first subset of the labeled ML training data samples, wherein the first pixel pattern comprises a first set of pixels having a first opacity factor and a second set of pixels having a second opacity factor, wherein the first opacity factor and the second opacity factor are independently selectable;
selecting the first and second opacity factors;
scaling the pixel pattern for each sample of the first subset of ML training samples by changing an aspect ratio of the pixel pattern for each sample of the first subset;
selecting a target label that is unrelated to the predetermined class;
relabeling each sample of the first subset of labeled ML training data samples with the target label; and
training the ML model with the labeled set of ML training samples and the first subset of relabeled ML training samples having the first pixel pattern to produce a trained and watermarked ML model.

24. A method for watermarking a machine learning (ML) model for use in object detection, the method comprising:
selecting a set of training samples to use for training the ML model;
selecting a first subset of samples from the set of training samples, each of the first subset of samples having an object of a predetermined class;
selecting a first pixel pattern to use as a watermark in the first subset of samples;
drawing a bounding box around each of the objects in the first subset of samples, wherein the bounding box has a first dimension and a second dimension;
inserting the first pixel pattern into each bounding box of the first subset of samples, wherein the first pixel pattern is scaled for each bounding box for each of the objects such that a first dimension of the first pixel pattern substantially matches one of the first or second dimensions of the bounding box;
removing the bounding box from around each of the objects in the first subset of samples; and
training the ML model with the set of training samples and the first subset of samples to produce a trained and watermarked ML model.

* * * * *